Figure 1:
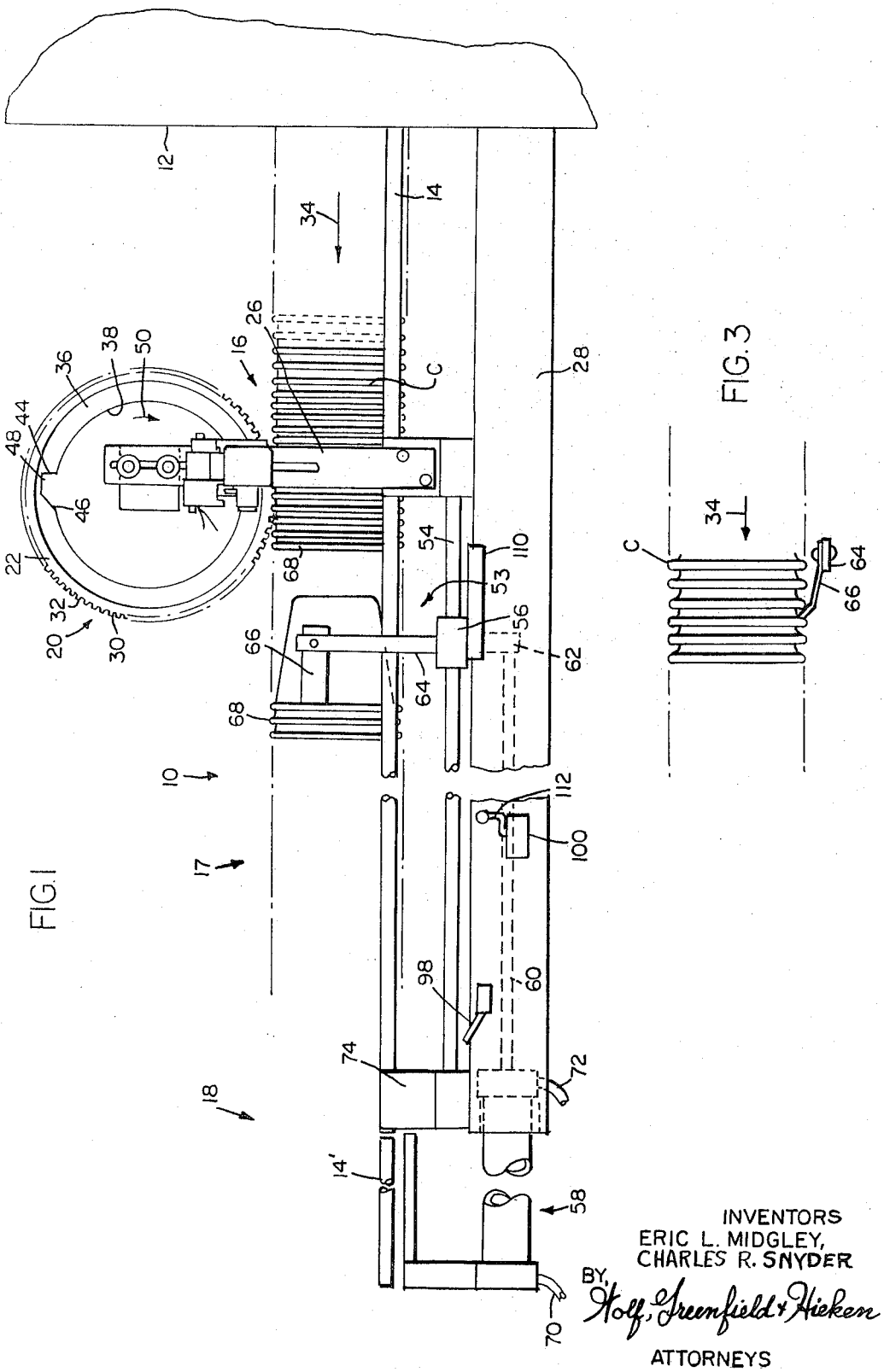

April 11, 1967 E. L. MIDGLEY ETAL 3,313,482
COUNTING DEVICE
Filed Aug. 18, 1965 2 Sheets-Sheet 1

INVENTORS
ERIC L. MIDGLEY,
CHARLES R. SNYDER
BY
Holz, Greenfield & Hieken
ATTORNEYS

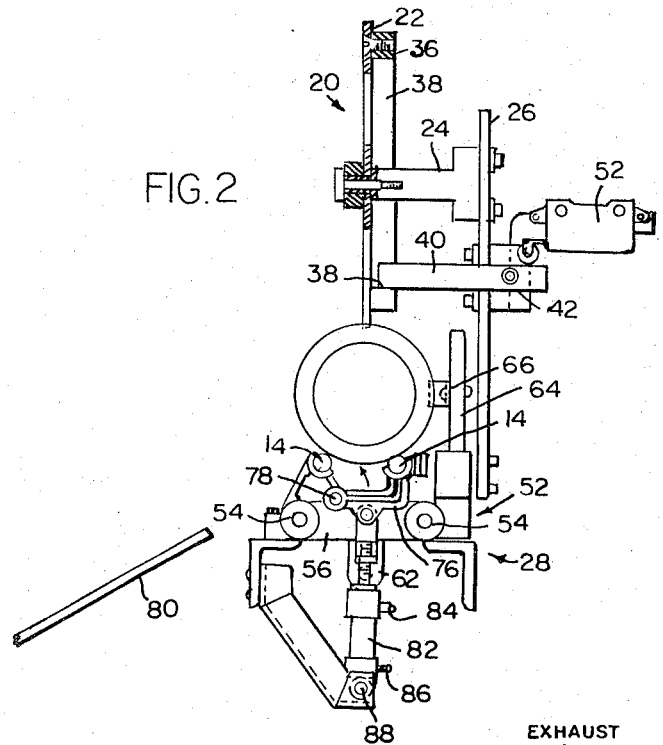
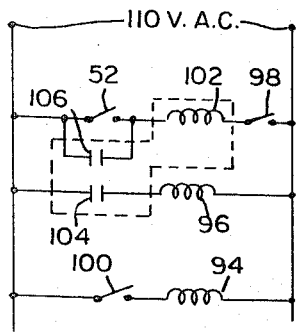
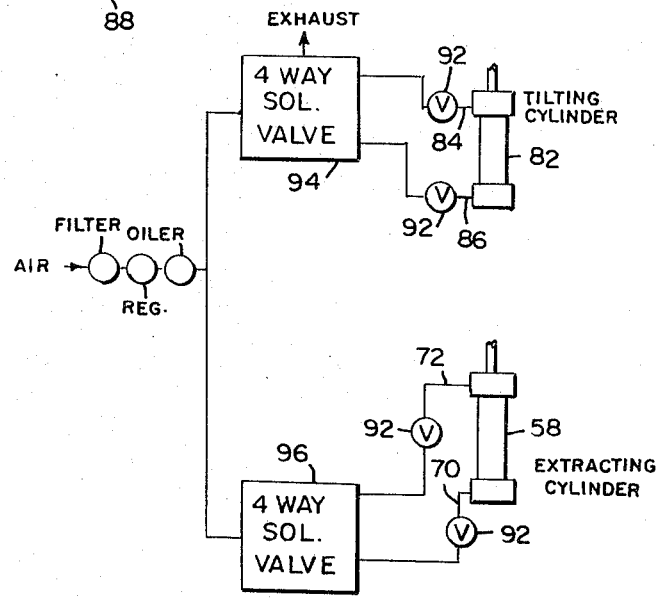
FIG. 2
FIG. 4
FIG. 5
INVENTORS.
ERIC L. MIDGLEY,
BY CHARLES R. SNYDER
*Wolf, Greenfield + Hieken*
ATTORNEYS

# United States Patent Office 3,313,482
Patented Apr. 11, 1967

3,313,482
COUNTING DEVICE
Eric L. Midgley, Danvers, and Charles R. Snyder, East Braintree, Mass., assignors to Sweetheart Plastics, Inc., Wilmington, Mass., a corporation of Maryland
Filed Aug. 18, 1965, Ser. No. 480,622
7 Claims. (Cl. 235—98)

This invention relates to counting devices and more particularly comprises a new and improved counting device for grouping in prescribed numbers closely spaced articles.

It is not uncommon for those engaged in the manufacturing and selling of inexpensive articles packaged in bulk to purposely overstock each package in order to avoid short supplying customers. For example, in the bulk packaging of throw-away cups, dishes and the like, manufacturers often package as many as 105 units in a sleeve represented to contain 100 units in order to avoid any possibility of short changing the purchaser. Such practices obviously raise the manufacturing costs, and these costs may or may not be passed on to the purchaser in the price charged for the goods.

One important object of this invention is to provide a dependable and accurate counting device which may be used on a variety of different kinds of production equipment to accurately group selected numbers of articles produced by the equipment.

Another important object of this invention is to provide a counting device that is relatively inexpensive and completely dependable in its operation.

Yet another important object of this invention is to provide a counting device capable of receiving closely nested articles and separating selected numbers of said articles while preserving their nested relationship.

Yet another important object of this invention is to provide a counting device which after separating the articles into stacks of selected numbers moves the counted stacks to a separate location where they may be packaged by an operator without interference by the operation of the counting machine.

To accomplish these and other objects, the present invention includes among its many features, a support upon which the nested articles are fed in a particular direction. A gear-like wheel is disposed adjacent the support with the teeth formed on its periphery adapted to engage the edges of the articles whereby the articles act upon the wheel as a rack causing the wheel to turn as the articles move past it. A carriage is disposed adjacent the support and is movable back and forth in a direction generally parallel to the direction of travel of the articles as they are fed to the wheel. A finger is carried by the carriage and is disposed to engage the peripheries of the articles after each has passed the periphery of the wheel, and the finger is movable relative to the articles in the direction opposite to the direction of feed. The finger is immovable relative to the articles in the opposite direction, and in that direction therefore carries the articles with it. Means are connected to the carriage which move the carriage in the direction of travel of the articles when the wheel has turned through a prescribed number of degrees, and as the carriage moves faster than do the articles as they are being fed to the wheel, all those articles picked up by the finger move away from those behind it.

Throughout the following description the counter is described as used in connection with the counting of cups. It is to be understood, however, that the articles may be of any variety so long as they have means which can be engaged by the wheel and the finger to count the articles and move certain groups of articles away from others.

These and other objects and features of this invention along with its incident advantages will be better understood and appreciated from the following detailed description of one embodiment thereof, selected for purposes of illustration and shown in the accompanying drawing in which:

FIG. 1 is a side view of the counter constructed in accordance with this invention;
FIG. 2 is an end view of the counter;
FIG. 3 is a fragmentary detail view of the transport mechanism of the counter and illustrating the manner in which it moves cups counted by it;
FIG. 4 is a pneumatic diagram of the counter controls; and
FIG. 5 is a schematic diagram of the counter controls.

The counter 10 is shown in FIG. 1 to be connected to the discharge of the machine 12, which may be of any variety that discharges cups one at a time in nested fashion. Typically, the machine 12 may be a rim rolling machine which after performing the rolling operation on the cups discharges them in the nested fashion as shown in the drawing. The cups are shown being discharged from the machine onto a pair of rails 14 along which the cups slide on their rims in a horizontal position. The rails 14 extend from the machine 12 through a counting station 16, an accumulating station 17 and an ejector station 18.

A counting wheel 20 having a rim 22 having teeth about its periphery is supported for rotation on an arm 24 mounted adjacent the top of post 26 extending upwardly from frame 28. Each of the teeth 30 is separated by a shallow recess 32 which is sized to receive the rim of one cup as is clearly evident in FIG. 1. The stack of nested cups moves as a rack below the wheel 20 and engages its teeth to turn the wheel clockwise as viewed in FIG. 1 as the cups proceed in the direction of the arrow 34. It is important to note in FIG. 1 that each tooth or the dwell between adjacent teeth is engaged by the rim of a single cup, and rotation of the wheel 20 is very precisely controlled and governed by the speed of the movement of the cups 34 as they are discharged from the machine 12. It is to be understood that the cups as they leave the machine 12 are forced along by some form of feeding mechanism that drives them in nested relationship on the rails 14 and beneath the periphery of the wheel 20.

In the embodiment shown, the rim 22 carries an annular cam 36 fixed to and rotatable with it, and the inner surface 38 of the cam serves as the camming surface over which a follower 40 travels as the wheel 20 rotates. It is evident in FIG. 2 that the cam follower 40 rides on the surface 38 and because of its pivotal support 42 is allowed to follow any irregularities in the surface 38. In FIG. 1 the surface 38 of the cam 36 is shown provided with a drop off 44 to low portion 48 and a gradual incline 46 from the base of the low portion 48 back to the main plane of surface 38. Thus, as the wheel 20 rotates clockwise in the direction of the arrow 50, the cam follower 40 remains in a fixed position until it reaches the drop off 44, and at that point the end of the follower 40 riding on the surface 38 drops into the low portion 48 where it remains temporarily and then rides out of the low portion up the inclined surface 46. It is evident that while one drop off is shown, a number of such points may be arranged about the surface 38 depending upon the particular number of articles to be counted. In the embodiment shown, employing but a single drop off, the cam and follower will count the number of articles equal to the number of teeth on the periphery of the wheel 20 between each actuation of the cam follower.

The cam follower is shown in FIG. 2 to operate a microswitch 52. The switch is actuated each time the end of cam follower 40 falls into the low portion 48 at drop off 44. The microswitch 52 in turn controls the operation of a certain solenoid valve which will be described below in connection with FIGS. 4 and 5.

The mechanism now to be described transports a selected number of counted cups that have stacked up at accumulating station 17 so as to separate them from the following cups being discharged by the machine 12 and being counted by the periphery of the wheel 20. The transport mechanism separates the counted cups from the continuous nested stack and delivers them to the ejector station 18. The transport mechanism generally identified at 53 is mounted for horizontal movement upon a pair of guide rods 54 that extend horizontally immediately above frame 28. A carriage 56, forming part of the transport mechanism, is designed to move back and forth on the rods 54 under the influence of pneumatic cylinder 58. The cylinder 58 mounted on the frame 28 has a piston rod 60 which is connected to a stem 62 either formed as an integral part of or connected to the carriage 56. The carriage supports a vertical post 64 which extends upwardly from one side thereof so that the transport assembly is free to move without interference from the rails 14 or the cups supported on them. The post 64 in turn carries a finger 66 which extends into the path of the rims 68 of the cups C as they move in the direction of arrow 34.

The finger 66 is flexible and acts as a ratchet to allow each of the cup rims to pass behind it as viewed in FIGS. 1 and 3. However, the finger 66 has considerable longitudinal stiffness, and consequently when the carriage moves to the left, the finger does not flex but rather bears against the rim of the cup engaged by its end and pushes it along with all the cups to its left as viewed in FIG. 1 in the same direction as the finger itself moves as part of the transport mechanism. Further, the finger 66 is allowed during its return to move to the right relative to the cups C without disturbing the cups over which the finger passes.

The cylinder 58 is shown to have a pair of inlets 70 and 72 on each side of the piston (not shown) to allow air to be directed to either side of the piston to move it left and right in accordance with the operation of the device. The manner in which the piston is controlled will be described in connection with FIGS. 4 and 5.

The rails 14 extend into the ejector station 18. However, as noted in FIG. 1, one rail 14 is split so that its end 14' is free to move relative to the remaining portion of the rail 14 which extends from the machine 12 to the block 74. The other rail 14 (the left rail as viewed in FIG. 2) is not broken and therefore is not free to move in the ejector station 18.

The movable portion 14' of the rail 14 shown on the right as viewed in FIG. 2 is supported on a casting 76 pivotally supported on pin 78. The casting is shown in its normal downward position wherein the end 14' of the rail is aligned axially with the remaining portion of the rail. However, the casting is permitted to pivot in a counterclockwise direction as viewed in FIG. 2 about its pivot so that its rail portion 14' moves upwardly and to the left. It will be appreciated that when the cups are disposed on the rails 14 and 14' as viewed in FIG. 2 and the rail 14' moves about pivot 78, the containers will be dumped from the rail and will roll onto the inclined table 80. The casting is actuated by an air cylinder 82 having a pair of inlets 84 and 86 to move its piston back and forth within the cylinder. The cylinder 82 is pivotally supported on the frame by pin 88 so that when the piston of the cylinder is actuated to move the casting 76 and its rail 14' the cylinder itself is allowed to move.

From the foregoing description it will be appreciated that when the cylinder 82 is actuated, it causes the railing 14' to move upwardly to throw off the stack of cups which are carried in part by it and by the opposite railing 14. Thus, a number of nested cups deposited on the railing 14' by the transport assembly 52 may be discharged from the counter while remaining in the nested condition to a position where they may be conveniently picked up as a stack by an operator and be packaged in bags or other forms of closures.

In FIG. 4 the pneumatic system for operation of the extracting cylinder 58 of the transport mechanism 52 and the tilt cylinder 82 of the ejector mechanism is shown. Each of the two cylinders 82 and 58 receives air on each side of its piston through flow control valves 92 and four way solenoid valves 94 and 96 respectively. The four way solenoid valve 94 controls the flow of air to either side of the tilt cylinder 82 and in turn is connected to line air through a filter, regulator, and oiler assembly. The four way solenoid valve 96 which controls the flow of air to either side of the transport cylinder 58 is connected to the same air supply through the same filter, regulator, and oiler assembly.

Disposed beneath the guide rods 54 that support the carriage 56 of the transport mechanism are a pair of switches 98 and 100 which respond to contact by the carrier 56 and/or actuator 110. When the actuator 110 moves to the left with the carrier 56 as viewed in FIG. 1, it engages the switch 100, but the switch 100 is designed to be actuated only when contacted by the actuator 110 as the actuator moves from left to right as viewed in FIG. 1. As the carriage moves further to the left as shown in FIG. 1, it engages switch 98 and trips it. It will be noted in FIG. 1 that the switch 98 lies adjacent the end of the stroke of the carriage.

The functions performed by the two switches 98 and 100 are evident in FIG. 5. The switch 98 is shown connected in a line across 110 v., A.C., which includes a holding coil 102 and the microswitch 52 actuated by the counter wheel 20 and cam follower 40. The switch 100 is shown connected in a line which includes the coil of solenoid valve 94. The coil of solenoid valve 96 lies in another line having a normally open switch controlled by the holding coil 102. The holding coil 102 also operates a normally open switch 106.

In operation, when the counter microswitch 52 closes in response to a complete revolution of the wheel 22 (the cam follower 40 dropping off fall off 44), the holding coil 102 is energized because the switch 98 is normally closed. The energization of the holding coil caused by closing of the switch 52 in turn causes the normally open switches 104 and 106 to close, and this in turn causes energization of the coil of the four way solenoid valve. The closed switch 106 maintains the line closed to continue energization of the coil 102 after switch 52 again opens. The solenoid valve is normally piped so as to bias the piston rod 60 to the extended position shown in FIG. 1, by air normally supplied to the cylinder through the inlet 70. When the coil of solenoid valve 96 is energized, the inlet 70 to the cylinder 58 is closed and air is supplied through inlet 72 to the other side of the cylinder, which causes the carriage to move to the left as viewed in FIG. 1. When the carriage moves to the left, at the end of its stroke it opens the switch 98 which is normally closed, which deenergizes holding coil 102 causing the two normally open switches 104 and 106 to open and in turn deenergize the four way solenoid valve 96. Consequently, the cylinder inlet 72 is again disconnected from the source of the air, and the inlet 70 is connected to cause the piston to travel to the right as viewed in FIG. 1. As the carrier 56 moves to the right as viewed in FIG. 1, its actuator 110 engages the switch 100 as it moves from left to right, and the switch 100, which is normally open, closes. When that switch closes, the solenoid valve 94 is energized which causes the cylinder 82 to receive air through its inlet 86 and tilt the ejector mechanism by elevating rail 14'. The switch 100 is maintained in the closed position for a period determined by the length of the actuator 110. When the actuator 110 releases the switch 100 as it passes beyond switch blade 112, the solenoid 94 is deenergized and the cylinder 82 returns to its normal position wherein the air is directed to the opposite side of the piston through inlet 84 to maintain it in its retracted position.

Those skilled in the art will appreciate that numerous modifications may be made of this invention without departing from its spirit. It will also be appreciated that the device may be adjusted readily so as to accommodate a wide variety of sizes and types of articles. Moreover, the cam on the wheel may be changed to vary the number of actuations of the switch 52. Thus, the cam may have two or more drop offs about its entire surface, rather than the one illustrated. It is important to note that the number of cups pushed by the finger 66 between actuations of switch 52 will determine the number of cups in each separated stack. Therefore, it is not intended to limit the breadth of this invention to the single embodiment illustrated and described. Rather, it is intended that the scope of this invention be determined by the appended claims and their equivalents.

What is claimed is:

1. A counter for rimmed containers comprising
    a support over which containers to be counted can move,
    a toothed wheel mounted for rotation in place above the support and in the path of the rims of the containers whereby the container rims serve as a rack to turn the wheel,
    a transport mechanism disposed adjacent the support for engaging a container and moving it and those ahead of it away from oncoming containers,
    means responsive to rotation of the wheel through a selected number of degrees for actuating the transport mechanism,
    means responsive to the transport mechanism reaching a set position for returning it to its initial position,
    and a tilt mechanism connected to the support and responsive to the movement of the transport through an intermediate position for removing the separated containers from the support.

2. In a counter for separating selected numbers of nested rimmed containers,
    a pair of parallel rails upon which the nested containers are to be fed rim first,
    a gear-like wheel disposed adjacent the rails with its teeth adapted to be engaged by the rims whereby as each container moves by the wheel the wheel turns in place,
    a carriage disposed adjacent the rails and movable back and forth parallel to the rails,
    a resilient finger carried by the carriage and disposed to engage the rim of each container after each passes the periphery of the wheel without imparting motion to each container separately, said finger being movable relative to the containers in the direction opposite to the direction of movement of the containers on the rails and carrying all containers with it only when said carriage moves in the direction of movement of the containers on the rails,
    and counting means responsive to a prescribed number of containers having engaged the wheel for moving the carriage in the direction of movement of the containers.

3. In a counter as defined in claim 2, said counting means including
    a cylinder and piston connected to the carriage for moving the carriage back and forth parallel to the rails,
    and an electro-pneumatic control circuit for operating the cylinder and responsive to the rotation of the wheel through a prescribed number of degrees.

4. In a counter for separating selected numbers of closely spaced articles,
    a support,
    means for moving the articles to be counted over said support in closely spaced relationship,
    a wheel disposed adjacent the support and positioned to be engaged and rotated by the articles as they move on said support in the manner of a gear and rack,
    means responsive to the rotation of the wheel through a selected number of degrees for pushing the articles which have engaged the wheel away from the oncoming articles,
    said last-mentioned means comprising a carriage movable back and forth parallel to and adjacent said support, and a resilient finger carried by the carriage and engaging each article which passes the wheel without imparting motion to each container separately, said finger being movable in one direction relative to the article engaged by it and being immovable in the other direction relative to said articles whereby movement in said other direction carries the articles with it.

5. In a counter for separating selected numbers of nested rimmed containers,
    a pair of parallel rails upon which the nested containers are to be fed rim first,
    a gear-like wheel disposed adjacent the rails with its teeth adapted to be engaged by the rims whereby as each container moves by the wheel the wheel turns in place,
    a carriage disposed adjacent the rails and movable back and forth parallel to the rails,
    a finger carried by the carriage and disposed to engage the rim of each container after each passes the periphery of the wheel, said finger being movable relative to the containers in the direction opposite to the direction of movement of the containers on the rails and carrying all containers with it only when said carriage moves in the direction of movement of the containers on the rails,
    counting means responsive to a prescribed number of containers having engaged the wheel for moving the carriage in the direction of movement of the containers,
    and an ejector mechanism including a pair of rails into which the containers are moved by the carriage, means for raising one of the rails above the height of the other to roll containers over the other of the rails, and means responsive to the travel of the carriage over a prescribed distance in a particular direction for activating the raising means.

6. A combination as defined in claim 5 further characterized by said counting means including
    a cylinder and piston connected to the carriage for moving the carriage back and forth parallel to the rails,
    another piston and cylinder forming part of the ejector mechanism for raising said one rail,
    and an electro-pneumatic control circuit for operating the cylinders.

7. A combination as defined in claim 5 further characterized by the counting means including
    an annular cam mounted on the wheel and having at least one drop off over its surface,
    a follower riding on the cam,
    and means including a switch actuated by the follower for actuating the counting means.

References Cited by the Examiner

UNITED STATES PATENTS

| 1,192,705 | 7/1916 | Taliaferro | 235—98 |
| 1,635,532 | 7/1927 | Burnham | 93—93 |
| 1,641,476 | 9/1927 | Edwards | 235—98 |
| 2,485,328 | 10/1949 | Spraker | 235—98 |
| 2,723,606 | 11/1955 | Brockardt | 235—98 X |
| 3,127,803 | 4/1964 | Midgley | 235—98 X |

RICHARD B. WILKINSON, *Primary Examiner.*

T. J. ANDERSON, *Assistant Examiner.*